LOWREY, CASE & CHEW.
Corn Planter.
No. 75,174.
Patented March 3, 1868.
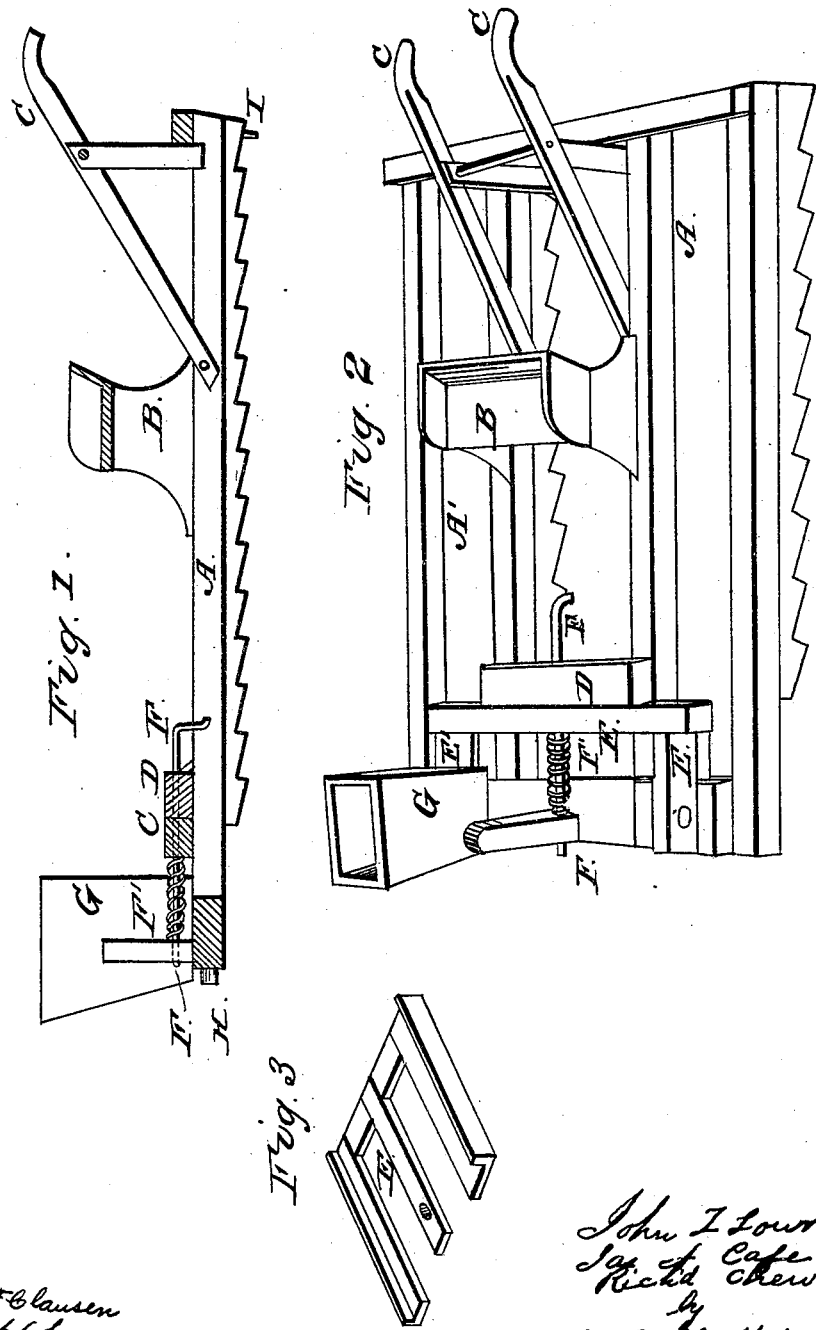

United States Patent Office.

JOHN T. LOWREY, JAMES A. CASE, AND RICHARD CHEW, OF HIGH BANKS, INDIANA.

Letters Patent No. 75,174, dated March 3, 1868.

IMPROVEMENT IN CORN-PLANTERS.

The Schedule referred to in these Letters Patent and making part of the same.

TO ALL WHOM IT MAY CONCERN:

Be it known that we, JOHN T. LOWREY, JAMES A. CASE, and RICHARD CHEW, of High Banks, in the county of Pike, and State of Indiana, have invented a new and useful Improvement in Corn-Planters; and we do hereby declare that the following is a full, clear, and exact description of the same, reference being had to the annexed drawings, making part of this specification, in which—

Figure 1 is a vertical longitudinal section.

Figure 2 is a perspective view; and

Figure 3 is a perspective view of the slide used with a single drag.

The same letters are employed in all the figures for the indication of the same parts.

Our invention relates to the arrangement of an adjustable drag, carrying planting-mechanism for planting corn in one or two rows.

In the annexed drawing, A is the drag, of which the right side, A', is detachable, so that it may be used alone for planting a single row of corn. The bottom of the drag is corrugated, as shown. B is the driver's seat, and C the guiding-handles. D is a tie-brace, connecting the two sides, being fastened by screws, so that it may be detached. The front part of the frame and also the rear brace are so constructed that the frame of the drag may be separated, the right-hand portion being fitted to receive the operating-mechanism, and employed in planting a single row. E is the slide, having arms, E', resting on the front part of the frame. There is a hole in these arms, to receive the grain, which, when the slide is pushed forward, allows the grain to drop in front of the drag, where it will be covered by the drag passing over it. T is a rod, passing through the tie-brace D, and through a standard on the front of the frame. It is attached to the slide E, and pressed backward by a spring, F', surrounding it. It is actuated by the foot of the driver pushing it forward to drop the grain, while the spring forces it back on his foot being removed. G is the hopper, which, setting upon the front-frame over the hole in the slide E, has a corresponding hole in the bottom, to permit the grain to fall into the hole in the slide when the latter is drawn back. A thin piece of metal at H divides the grains falling out of the hole in the slide, and prevents them falling on top of one another. A pin, I, in the rear of the drag, immediately behind the seed-holes in the slide, is intended to make a mark on the ground, indicating where the row of corn is planted.

When the part A' of the drag is used alone, the seat, handles, and tie-brace D are all transferred to that part, the slide shown in fig. 3 being used instead of the slide E. The drag may then be used to plant a single row.

What we claim as our invention, and desire to secure by Letters Patent, is—

The combination of the drag A, so constructed that the part A' may be detached, in combination with the parts B, C, D, E, F, and G, arranged to operate for planting double or single rows, substantially as described.

In testimony whereof, we have signed our names to this specification in the presence of two subscribing witnesses.

JNO. T. LOWREY,
JAS. A. CASE,
R. CHEW.

Witnesses:
SPENCER GRAY,
G. M. CASE.